United States Patent
Bortnyk et al.

(10) Patent No.: US 7,079,820 B2
(45) Date of Patent: Jul. 18, 2006

(54) COMBINING SIGNALS EXHIBITING MULTIPLE TYPES OF DIVERSITY

(75) Inventors: George P. Bortnyk, Seminole, FL (US); David J. Lupia, Oldsmar, FL (US)

(73) Assignee: Raytheon Company, Waltham, MA (US)

( * ) Notice: Subject to any disclaimer, the term of this patent is extended or adjusted under 35 U.S.C. 154(b) by 30 days.

(21) Appl. No.: 11/007,084

(22) Filed: Dec. 7, 2004

(65) Prior Publication Data

US 2005/0104770 A1    May 19, 2005

Related U.S. Application Data

(62) Division of application No. 10/346,906, filed on Jan. 17, 2003, now Pat. No. 6,833,810.

(60) Provisional application No. 60/350,188, filed on Jan. 18, 2002.

(51) Int. Cl.
- H04B 17/02 (2006.01)
- H04B 7/10 (2006.01)
- H04B 1/10 (2006.01)

(52) U.S. Cl. .............. 455/133; 455/132; 455/134; 455/273; 375/148; 375/150; 375/346; 375/349

(58) Field of Classification Search ........ 455/132–135, 455/137, 273, 277.2; 375/334–347, 267, 375/349, 148, 150, 152; 370/335, 336, 342, 370/343, 478; 342/194–195, 361, 367
See application file for complete search history.

(56) References Cited

U.S. PATENT DOCUMENTS

| | | | |
|---|---|---|---|
| 3,783,385 A | 1/1974 | Dunn et al. | 375/329 |
| 5,465,271 A | 11/1995 | Hladik et al. | 375/267 |
| 5,481,570 A * | 1/1996 | Winters | 375/347 |
| 5,490,180 A | 2/1996 | Muto | 375/347 |
| 5,559,838 A * | 9/1996 | Nakagoshi | 375/347 |
| 5,933,466 A | 8/1999 | Oshima et al. | 375/347 |
| 6,148,186 A | 11/2000 | Fujita | 455/137 |
| 6,456,608 B1 | 9/2002 | Lomp | 370/335 |
| 6,512,738 B1 | 1/2003 | Namekata et al. | 370/210 |
| 6,603,961 B1 * | 8/2003 | Kuroda | 455/133 |
| 6,650,881 B1 | 11/2003 | Dogan | 455/276.1 |
| 6,940,932 B1 * | 9/2005 | Henriksson | 375/347 |
| 2003/0060178 A1 | 3/2003 | Ghassemzadeh et al. | 455/277.1 |

(Continued)

FOREIGN PATENT DOCUMENTS

EP    0 430 481 A2    6/1991

(Continued)

OTHER PUBLICATIONS

Patents Act 1977: Search Report under Section 17, International Application No. GB 0301193.9, 3 pgs, Jun. 12, 2003.

(Continued)

*Primary Examiner*—Thomas H. Tarcza
*Assistant Examiner*—Isam Alsomiri
(74) *Attorney, Agent, or Firm*—Baker Botts L.L.P.

(57) ABSTRACT

Combining signals includes receiving first signals having a first frequency and second signals having a second frequency. A first weight reflecting a signal-to-noise ratio associated with a first signal is determined for each first signal, and a first signal output is generate from the first signals in accordance with the first weights. A second weight reflecting a signal-to-noise ratio associated with a second signal is determined for each second signal, and a second signal output is generate from the second signals in accordance with the second weights. The first signal output and the second signal output are combined to yield a combined signal output.

17 Claims, 4 Drawing Sheets

U.S. PATENT DOCUMENTS

2003/0236108 A1* 12/2003 Li et al. .................. 455/562.1

FOREIGN PATENT DOCUMENTS

| EP | 1 296 466 A2 | 3/2003 |
| --- | --- | --- |
| GB | 2 324 932 A | 11/1998 |
| GB | 2 346 765 A | 8/2000 |
| WO | WO 01/80506 A2 | 10/2001 |

OTHER PUBLICATIONS

UK Patent Office Search Report dated Jul. 16, 2003 for Application No. GB 0301193.9 filed Jan. 20, 2003.

UK Patent Office Search Report dated Jul. 17, 2003 for Application No. GB 0301193.9 filed Jan. 20, 2003.

U.S. Appl. No. 10/219,128 filed Aug. 15, 2002, entitled Combining Signal Images in Accordance with Signal-to-Noise Ratios, 44 total pages.

Halpern, S.W., "*The Theory of Operation of an Equal-Gain Predetection Regenerative Diversity Combiner with Rayleigh Fading Channels,*" IEEE Transactions on Communications, vol. Com-22, No. 8, pp. 1099-1106, Aug. 1974.

Halpern, Samuel W., "*The Effect of Having Unequal Branch Gains in Practical Predetection Diversity Systems for Mobile Radio,*" IEEE Transactions on Vehicular Technology, vol. VT-26, No. 1, pp. 94-105, Feb. 1977.

Edwards, Arthur E., "*Rapid Fading Effects on Airborne Satellite Communication Receivers Employing Granlund Pre-Detection Diversity Combiners,*" Conference Record vol. 3 of 3, Sponsored by IEEE Communications Society and Armed Forces Communications and Electronics Association, D-7803-2489-7/95 © 1995 IEEE, cover and pp. 1013-1020, Nov. 8, 1995.

Edwards, Arthur E., et al., "*Loss of Phase Coherence in Granlund Pre-Detection Diversity Combiners,*" MILCOM 96 Conference Proceedings, vol. 3 of 3, Sponsored by IEEE Communications Society and the Armed Forces Communications and Electronics Association, D-7803-3682-8/96 © 1996, cover and pp. 791-795, Oct. 24, 1996.

Kostek, Stephen and Franke, Ernie, "*Common Integrated Broadcast Service-Modules (CIBS-M) to Expand the Joint Tactical Terminal (JIT) Family,*" MILCOM 1999 Conference Proceedings, vol. 1, Sponsored by IEEE Communications Society and Armed Forces Communications and Electronics Association, D-7803-5538-5/99 © 1999, cover and pp. 591-597, Oct. 31, 1999-Nov. 3, 1999.

\* cited by examiner

COMBINING SIGNALS EXHIBITING MULTIPLE TYPES OF DIVERSITY

RELATED APPLICATIONS

This application is a divisional of U.S. patent application Ser. No. 10/346,906 entitled, "Combining Signals Exhibiting Multiple Types of Diversity," filed Jan. 17, 2003 now U.S. Pat. No. 6,833,810.

This application claims benefit under U.S.C. § 119(e) of U.S. Provisional Application Ser. No. 60/350,188, entitled, "QUAD DIVERSITY SIGNAL IMAGE COMBINING," filed Jan. 18, 2002.

This application is related to U.S. patent application Ser. No. 10/219,128, entitled "COMBINING SIGNAL IMAGES IN ACCORDANCE WITH SIGNAL-TO-NOISE RATIOS," filed Aug. 15, 2002.

GOVERNMENT FUNDING

The U.S. Government may have certain rights in this invention as provided for by the terms of Grant No. N00039-01-9-4003, awarded by SPAWAR of the U.S. Navy.

TECHNICAL FIELD OF THE INVENTION

This invention relates generally to communications systems, and more specifically to combining signals exhibiting multiple types of diversity.

BACKGROUND OF THE INVENTION

Signals from multiple receivers may be combined to determine content included in the signals. Known techniques for signal combining, however, may not be able to combine signals that exhibit multiple types of diversity such as temporal, frequency, polar, or spatial diversity. Consequently, known techniques for signal combining are unsatisfactory in certain situations.

SUMMARY OF THE INVENTION

In accordance with the present invention, disadvantages and problems associated with previous techniques for combining signals may be reduced or eliminated.

According to one embodiment of the present invention, combining signals includes receiving first signals having a first frequency and second signals having a second frequency. A first weight reflecting a signal-to-noise ratio associated with a first signal is determined for each first signal, and a first signal output is generate from the first signals in accordance with the first weights. A second weight reflecting a signal-to-noise ratio associated with a second signal is determined for each second signal, and a second signal output is generate from the second signals in accordance with the second weights. The first signal output and the second signal output are combined to yield a combined signal output.

Certain embodiments of the invention may provide one or more technical advantages. A technical advantage of one embodiment may be that signals are combined in accordance with the signal-to-noise ratios associated with the signals, such that maximal ratio combining gain may be substantially realized. Accordingly, signals that exhibit multiple types of diversity such as temporal, frequency, polar, or spatial diversity may be combined.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE DRAWINGS

The invention and its advantages are best understood by referring to FIGS. 1 through 5 of the drawings, like numerals being used for like and corresponding parts of the various drawings.

Figure 1:
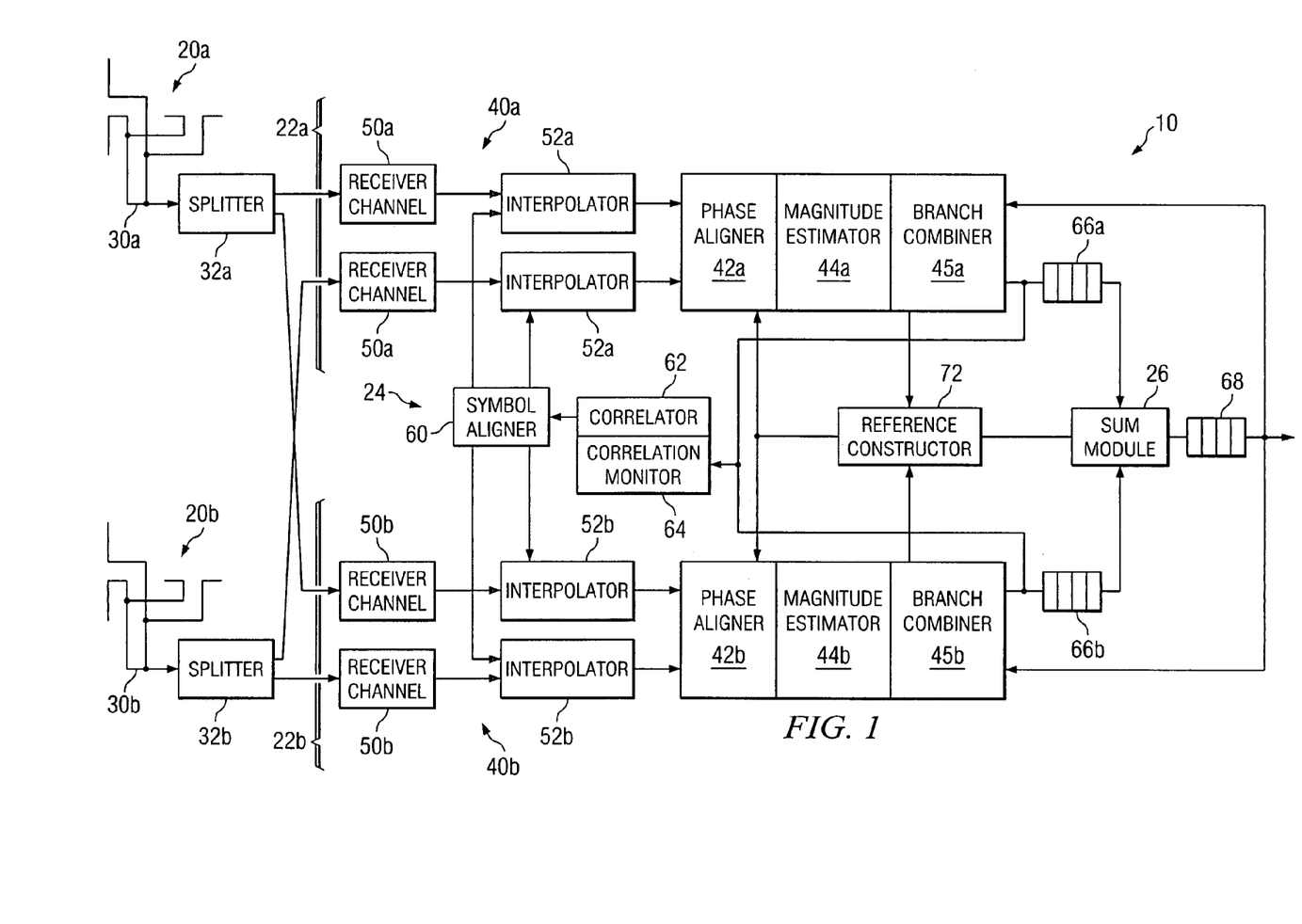
FIG. 1 is a block diagram of one embodiment of a system for combining signals.

FIG. 1 is a block diagram of one embodiment of a system 10 for combining signals. System 10 may be used to combine signals in accordance with signal-to-noise ratios associated with the signals, such that maximal ratio combining gain may be substantially realized. Signal-to-noise ratio weighting is insensitive to the specific cause or causes of variation of signal-to-noise ratio. Accordingly, signals that exhibit multiple types of diversity such as temporal, frequency, polar, or spatial diversity may be combined.

According to the illustrated embodiment, system 10 combines signals. The signals typically carry symbol streams, and different signals may carry substantially identical symbol streams. The signals may arrive at different times, resulting in a symbol offset among the symbols. In order to combine the signals, the signals are correlated to resolve the symbol offset. Signals may comprise, for example, phase shift keying (PSK) signals such as binary phase shift keying (BPSK) signals or staggered binary phase shift keying (SBPSK). Signals may have any suitable radio frequency and may be modulated according to any suitable modulation format.

System 10 includes antenna systems 20*a*–*b*, frequency branches 22*a*–*b*, a sum-weight module 26, a reference constructor 72, and coordinating modules 24 coupled as illustrated in FIG. 1. In general, antenna systems 20*a*–*b* receive signals and separate the signals with respect to frequency. Each frequency branch 22*a* receives the signals of a particular frequency and determines a signal magnitude estimate for each signal according to a signal-to-noise ratio associated with the signal. Sum-weight module 26 combines signals received from frequency branches 22*a*–*b* according to the weights determined by frequency branches 22*a*–*b*. Reference constructor 72 generates a correlation reference that frequency branches 22*a*–*b* use to estimate signal magnitude. Coordinating modules 24 correlate signals of the different frequency branches 22*a*–*b*.

According to the illustrated embodiment, an antenna system 20*a*–*b* includes one or more antennas 30*a*–*b* and a splitter 32a–b. Antennas 30a–b receive signals from one or more transmitters, and splitter 32a–b separates the signals with respect to frequency. Antennas 30a–b may comprise any antenna suitable for receiving signals from one or more transmitters. Antennas 30a–b may be polarized, separated, or both. Splitter 32a–b may comprise any device suitable for separating the signals according to frequency, and may perform other functions such as amplifying or filtering the signals.

Frequency branches 22a–b process the signals of a specific frequency, which allows system 10 to accommodate signals exhibiting frequency diversity. In the illustrated embodiment, system 10 includes two frequency branches 22a–b. System 10, however, may comprise any suitable number of frequency branches. A frequency branch 22a–b may include signal branches 40a–b, a phase aligner 42a–b, a magnitude estimator 44a–b, a branch combiner 45a–b, and buffers 66a–b and 68 coupled as shown in FIG. 1.

A signal branch 40a–b processes signals from an antenna system 20a–b, and includes a receiver channel 50a–b and an interpolator 52a–b. Receiver channel 50a–b receives and processes signals to yield signal images. Interpolator 52a–b applies a delay to the signals in order to compensate for symbol offsets, which may result from temporal, or spatial diversity. Accordingly, interpolator 52a–b allows system 10 to accommodate signals exhibiting such diversity. Interpolator 52a–b may comprise, for example, a polyphase interpolator that uses polyphase finite impulse response (FIR) structures to shift the phase of signals. A finite impulse response filter used in conjunction with a delay line may delay the signals with a phase resolution finer than one sample and allow the magnitude of the delay to vary over many symbol periods. Interpolator 52a–b may also provide additional or other functionality such as dynamic delay control, decimation of signals, or linear-phase channel filtering. Interpolator 52a–b is described in more detail with reference to FIG. 2. Other methods for realizing interpolation may be substituted for the polyphase filter interpolator in this invention.

Phase aligner 42a–b aligns the phases of signals received from interpolators 52a–b of frequency branch 22a–b. Magnitude estimator 44a–b calculates a signal magnitude estimate for each signal that reflects a signal-to-noise ratio associated with the signal. Magnitude estimator 44a–b is described in more detail with reference to FIG. 3. Branch combiner 45a–b combines the signals of frequency branch 22a–b. Buffers 66a–b and 68 store the combined signals, and may comprise first-in-first-out buffers.

Sum-weight module 26 generates weights from the signal magnitude estimates received from magnitude estimator 44a–b, and sums the signals according to the weights in order to generate a combined signal. The weights reflect the signal-to-noise ratios at signal branches 40a–d. A signal-to-noise-ratio improvement may be realized if the combined signal-to-noise ratio is better than the worst individual signal-to-noise ratio of a signal branch 40a–d. Maximal Ratio Combining performance may be substantially achieved if the signal-to-noise ratio of the combined output is better than the best individual signal's signal-to-noise ratio. Sum-weight module 26 is described in more detail with reference to FIG. 3.

Reference constructor 72 generates a correlation reference, which is used to estimate signal magnitude, from the signals at one or more frequency branches 22a–b. Frequency branches 22a–b may be selected in accordance with the signal energies at the frequency branches 22a–b. For example, if frequency branch 22a has acquired a signal, but frequency branch 22b has not acquired a signal, the correlation reference may derived using frequency branch 22a. A correlation reference may be derived from multiple frequency branches 22a–b. The contribution of each frequency branch 22a–b may be determined with respect to signal-to-noise-ratios at the frequency branches 22a–b. A correlation reference derived from multiple frequency branches 22a–b may be used at none, some, or all frequency branches 22a–b. Accordingly, any number of frequency branches 22a–b may contribute to and benefit from the correlation reference. Reference constructor 72 is described in more detail with reference to FIG. 4.

Coordinating modules 24 determine the correlation among the signals of frequency branches 22a–b, and provide instructions to interpolators 52a–d to align the symbols of the signals in order to correlate the signals. The signals are correlated if the symbols of the symbol streams are aligned, and are uncorrelated if the symbols are misaligned. Coordinating modules 24 include a correlation monitor 64, a correlator 62, and a symbol aligner 60.

Correlation monitor 64 monitors signal correlation and initiates correlation procedures in response to detecting signal decorrelation. Correlation monitor 64 generates correlation values that indicate positive and negative correlations among the signals. If the correlation values fail to satisfy certain threshold values, correlation monitor notifies correlator 62. Correlator 62 generates a symbol alignment tracking error, which is provided to symbol aligner 60. In response, symbol aligner 60 provides instructions to interpolators 52 to align symbols in order to correlate the signals. Coordinating modules 64 are described in more detail with reference to FIG. 5.

Modifications, additions, or omissions may be made to the system without departing from the scope of the invention. For example, system 10 may be configured to combine signals from any suitable number of antenna systems 20 at any suitable number of frequencies. For example, system 10 may be configured to combine signals from four antenna systems and at four different frequencies.

As another example, although system 10 may approximate maximal ratio combining, it is within the scope of the invention to include non-optimal weighting that may result from, for example, employing a non-optimal weight calculator. System 10 may include other compromises to optimal performance resulting from, for example, stability enhancement or single signal enhancement. Additionally, functions may be performed using any suitable logic comprising software, hardware, other logic, or any suitable combination of the preceding.

Figure 2:
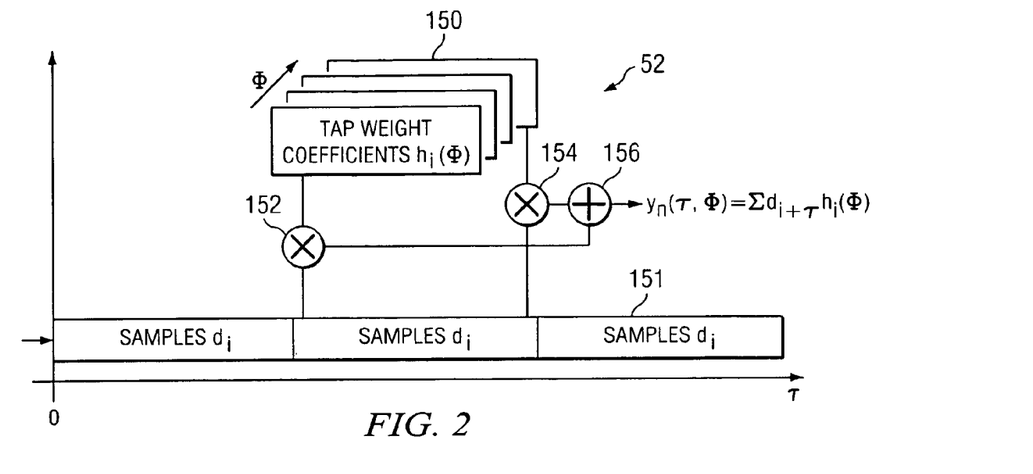
FIG. 2 is a block diagram of one embodiment of an interpolator of the system of FIG. 1.

FIG. 2 is a block diagram illustrating one embodiment of interpolator 52 of system 10 of FIG. 1. Interpolator 52 provides dynamic delay compensation to equalize symbol offsets between different signals, each of which carry substantially identical symbol streams. Typically, if identical symbol streams of signals are offset in time, the time offset is equalized before combining the signals.

Interpolator 52 includes a delay line 151, tap weight coefficients 150, multipliers 152 and 154, and an adder 156. Delay line 151 stores samples of the signals received from a receiver channel 50a–b. For example, delay line 151 may comprise a 512-word delay line that stores samples $\{d_i\}$, where $0 \leq i \leq 511$. Delay line 151, however, may have any suitable length. Delay line 151 may be implemented using linear delay techniques or circular buffering techniques.

Tap weight coefficients 150 are used to adjust the delay applied to the samples. For example, tap weight coefficients 150 comprise tap weight coefficient sets $\{h_r(\phi)\}$ for $0 \leq i \leq 127$, where $\phi$, $0 \leq \phi \leq 4$, represents a phase of a finite impulse response filter. Phase $\phi$ and a pointer value $\tau$ determine the relative delay applied to the symbols streams. Initial values for phase $\phi$ and for pointer value $\tau$ may provided by symbol aligner 60, and the values of pointer value $\tau$ and phase $\phi$ may be adjusted to change the relative delay. Delay resolution may be controlled by selecting a tap weight coefficient set for an increment of the samples.

In operation, multipliers 152 and 154 multiply tap weight coefficients $h_i(\phi)$ with samples $d_i$ to form products $d_{i+\tau} h_i(\phi)$. Adder 156 adds the products to yield an output $$y_n(\tau, \varphi) = \sum_i d_{i+\tau} h_i(\varphi)$$

that may be used to apply a delay to the samples. A processor may be used to control the operation of the elements of interpolator 52.

Modifications, additions, or omissions may be made to interpolator 52 without departing from the scope of the invention. For example, interpolator 52 may include more or fewer tap weight coefficients 150. In addition, the phase resolution of interpolator 52 may be varied to realize a specific filter response. For example, the phase resolution may be increased or decreased by increasing or decreasing the number of coefficients or the number of tap weight coefficient sets, such that a lesser or greater phase difference exists between the adjacent tap weight coefficient sets, respectively. Additionally, functions may be performed using any suitable logic comprising software, hardware, other logic, or any suitable combination of the preceding.

Figure 3:
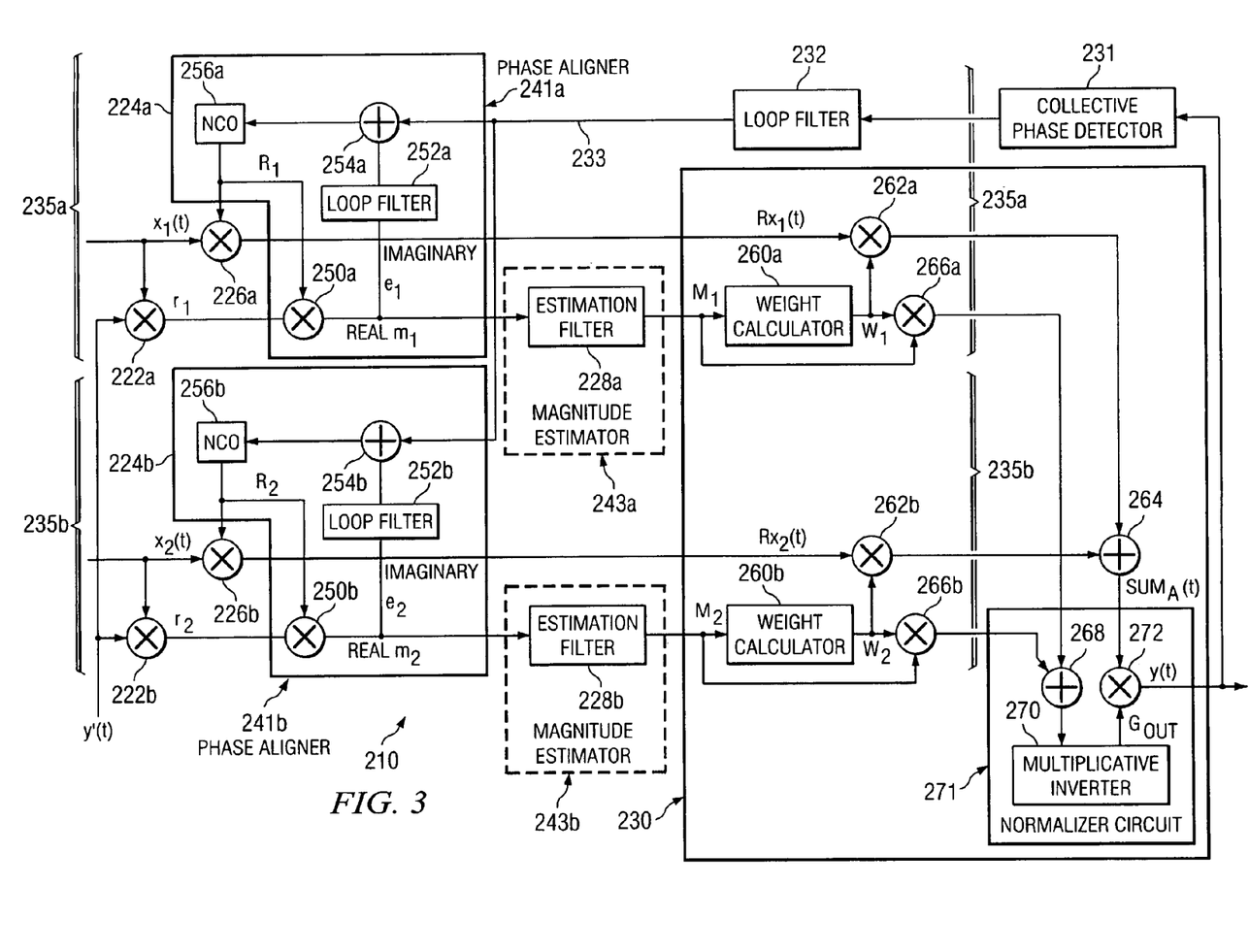
FIG. 3 is a block diagram of one embodiment of a system that includes phase aligners and magnitude estimators.

FIG. 3 is a block diagram of one embodiment of a system 210 that includes phase aligners 241$a$–$b$ and magnitude estimators 243$a$–$b$. In general, system 210 correlates signal images $x_i(t)$ with a correlation reference $y'(t)$ to yield phasors $r_i$, and generates signal magnitude estimates $M_i$ from the phasors $r_i$. Weights $W_i$ of signal images $x_i(t)$ are determined from the signal magnitude estimates $M_i$. Each weight $W_i$ reflects the signal-to-noise ratio associated with the corresponding signal image $x_i(t)$. "Each" as used in this document refers to each member of a set or each member of a subset of the set. The phase of unity magnitude phasors $R_i$ that substantially track the phases of phasors $r_i$ are applied to signal images $x_i(t)$ to yield phase-aligned signal images $Rx_i(t)$ that are substantially phase aligned.

Weights $W_i$ are applied to phase-aligned signal images $Rx_i(t)$ to yield weighted phase-aligned signal images $WRx_i(t)$, which have substantially the same phase. System 210 adds the weighted phase-aligned signal images $WRx_i(t)$ and normalizes the result to generate a combined signal output $y(t)$, which is modified to generate correlation reference $y'(t)$.

According to the illustrated embodiment, system 210 receives signals that are sampled as signal images $x_i(t)$ defined by Equation (1):

$$x_i(t) = \alpha_i d(t) + n_i(t) \qquad (1)$$

where i corresponds to a signal branch 40$a$, $d(t)$ represents a signal, $\alpha_i$ represents a complex branch gain, and $n_i(t)$ represents noise, where each noise term $n_i(t)$ is mutually uncorrelated and uncorrelated relative to the signal $d(t)$. Signal $d(t)$ may comprise a phase-shift keying (PSK) signal, and noise $n_i(t)$ may comprise additive white Gaussian noise (AWGN).

Each channel branch 235$a$–$b$ receives signal images $x_i(t)$ and generates weighted phase-aligned signal images $WRx_i(t)$ from the signal images. Each channel branch 235$a$–$b$ includes a phase aligner 241$a$–$b$, a magnitude estimator 243$a$–$b$, a weight calculator 260$a$–$b$, and scalar multipliers 262$a$–$b$ and 266$a$–$b$. Phase aligner 241$a$–$b$ includes multipliers 222$a$–$b$ and 226$a$–$b$ and phase-locked loop (PLL) circuits 224$a$–$b$. Complex multipliers 222$a$–$b$ correlate signal images $x_i(t)$ with a correlation reference $y'(t)$ to yield phasors $r_i$. An expression for combined signal output $y(t)$, which may substantially represent correlation reference $y'(t)$, may be given by Equation (2):

$$y(t) = \frac{1}{\sum_i W_i M_i} \sum_i \left[ W_i |\alpha_i| d^*(t) + W_i R_i^* n_i^*(t) \right] \qquad (2)$$

The correlation of signal images $x_i(t)$ with the correlation reference $y'(t)$ may remove modulation, since $d\star(t)d(t)=1$.

Phase-locked loop circuits 224$a$–$b$ perform tracking and filtering to yield known magnitude phasors $R_i$ having frequencies and phases that match the frequencies of phasors $r_i$ or track the phases of phasors $r_i$. A phase-locked loop circuit 224$a$–$b$ may comprise a complex multiplier 250$a$–$b$, a numerically controlled oscillator (NCO) 256$a$–$b$, and a loop filter 254$a$–$b$. Complex multiplier 250$a$–$b$ correlates unity magnitude phasor $R_i$ with phasor $r_i$ to drive the imaginary component $e_i$ of phasor $r_i$ to zero and to resolve the real component $m_i$ of phasor $r_i$. The real component $m_i$ may be used to represent the magnitude of phasor $r_i$ by tracking the magnitude of the signal content $\alpha_i d(t)$ embedded in signal image $x_i(t)$.

According to one embodiment, a numerically controlled oscillator 256$a$–$b$ comprises a perfect integrator coupled to a complex sinusoid generator such that the output frequency is proportional to the input drive. According to the embodiment, a loop filter 252$a$–$b$ comprises an imperfect integrator and a feed-forward path. A loop filter 252$a$–$b$, along with an NCO 256$a$–$b$, determines the type of phase-locked loop realized. Complex multipliers 226$a$–$b$ apply unity magnitude phasors $R_i$ to signal images $x_i(t)$, adjusting the phase alignment of $\alpha_i d(t)$ embedded in $x_i(t)$, to yield adjusted signal images $Rx_i(t)$. The signal images are phase aligned to support phase coherent constructive addition to generate combined signal output $y(t)$.

Magnitude estimators 243$a$–$b$ include estimation filters 228$a$–$b$ that generate signal magnitude estimates $M_i$ from real components $m_i$. Signal magnitude estimates $M_i$ provide an estimate of the signal content of signal images $x_i(t)$. An estimation filter 228$a$–$b$ may comprise, for example, a narrow low pass filter to reduce the variance of the estimate. A real component $m_i$ may be based on the stationary ergodic processes of signal image $x_i(t)$, so the signal magnitude estimate $M_i$ may provide an accurate estimate of the signal content $|\alpha_i d(t)|$ of signal image $x_i(t)$.

Expressions (3) through (6) provide an explanation of the estimation process for determining signal magnitude estimate $M_i$. Expressions (3) through (6) assume that coefficient $K_1$ is set to a value close to unity, such that correlation reference $y'(t)$ substantially comprises combined signal output $y(t)$.

Equation (3) defines phasor $r_i$:

$$r_1 = x_1(t)y(t) \qquad (3)$$

$$= [\alpha_1 d(t) + n_1(t)]\left[\frac{\sum_i [W_i|\alpha_i|d^*(t) + W_i R_i^* n_i^*(t)]}{\sum_i W_i M_i}\right]$$

Expanding Equation (3) yields Equation (4):

$$r_1 = \alpha_1 d(t)d^*(t)\frac{1}{\sum_i W_i M_i}\sum_i W_i|\alpha_i| + \qquad (4)$$

$$\alpha_1 d(t)\frac{1}{\sum_i W_i M_i}\sum_i W_i R_i^* n_i^*(t) +$$

$$n_1(t)\frac{1}{\sum_i W_i M_i}d^*(t)\sum_i W_i|\alpha_i| + n_1(t)\frac{1}{\sum_i W_i M_i}\sum_i W_i R_i^* n_i^*(t)$$

The uncorrelated terms of Equation (4) average to zero at estimation filter 228, resulting in the following relationship described by Equation (5):

$$M_1 \cong E[m_1] \cong E[|r_1|] \cong |\alpha_1| + \frac{W_1}{\sum_i W_i M_i}n_1(t)R_1^* n_1^*(t) \qquad (5)$$

If the signal-to-noise ratio is high, the noise component $n_1$(t) is low, and if the signal-to-noise ratio is low, weight $W_1$ is very low. In either situation, the noise-cross-noise term is sufficiently small to substantially ignore. Therefore, the signal magnitude estimates $M_i$ may be described by Equation (6).

$$M_1 \cong |\alpha_1 d(t)|, \text{ or generally } M_i \cong |\alpha_i d(t)| \qquad (6)$$

Sum-weight module 230 determines weights $W_i$ applicable to signal images $x_i$(t) from signal magnitude estimates $M_i$. Each weight $W_i$ reflects the signal-to-noise ratio associated with the corresponding signal image $x_i$(t). Within sum-weight module 230, weights $W_i$ are applied to phase-aligned signal images to yield weighted phase-aligned signal images. Sum-weight module 230 combines the weighted phase-aligned signal images and normalizes the result to generate the combined signal output y(t), which is modified to yield correlation reference y'(t).

Weight calculators 260*a–b* calculate weights $W_i$ from signal magnitude estimates $M_i$. According to classical theory, maximal-ratio combining requires that signal images $x_i$(t) be weighted in accordance with $S/N^2$ and that $\{E[|x_i(t)|]\}=C$ is maintained by the automatic gain control. Accordingly, $E[n_1^2(t)]=C^2-M_1^2$. As a result, in general the weights $W_i$ may given by Equation (7):

$$W_i = \frac{M_i}{C^2 - M_i^2} \qquad (7)$$

Scalar multipliers 262*a–b* apply weights $W_i$ to adjusted signal images $Rx_i$(t) to generate weighted adjusted signal images $WRx_i$(t). A summing node 264 combines the weighted adjusted signal images $WRx_i$(t) to yield weighted sum $Sum_A$(t). The signal component of weighted sum $Sum_A$(t) may be defined by Equation (8):

$$\left|\sum_i W_i R_i \alpha_i d(t)\right| = \sum_i W_i M_i \qquad (8)$$

Multipliers 266*a–b* apply weights $W_i$ to signal magnitude estimates $M_i$ to yield weighted signal magnitude estimates $WM_i$.

A normalizer circuit 271 substantially maintains the embedded signal energy of correlation reference y'(t) at unity. Normalizer circuit 271 comprises an adder 268, a multiplicative inverter 270, and a dual scalar multiplier 272. Summing node 268 combines the weighted signal magnitude estimates $WM_i$. Multiplicative inverter 270 inverts the combined weighted signal magnitude estimates $WM_i$ to yield a normalization factor $G_{out}$, which may be defined by Equation (9):

$$G_{out} = \frac{1}{\sum_i W_i M_i} \qquad (9)$$

Multiplier 272 normalizes signal component of weighted sum $Sum_A$(t) to unity by applying normalization factor $G_{out}$ to weighted sum $Sum_A$(t). In the final expression, $|R\alpha_i|=|\alpha_i|$, and combined signal output y(t) may be described by Equation (10):

$$y(t) = \frac{\sum_i W_i R_i x_i(t)}{\sum_i W_i M_i} \qquad (10)$$

$$= \frac{1}{\sum_i W_i M_i}\sum_i [W_i|\alpha_i|d^*(t) + W_i R_i^* n_i^*(t)].$$

Carrier recovery loop 233 drives phase-locked loop circuits 224*a–b* to resolve the combined signal output y(t) to baseband, that is, zero frequency error. Carrier recovery loop 233 includes a collective phase detector 231 and a loop filter 232 that derive a phase error measurement, which may be applied to phase-locked loop circuits 224*a–b*. Carrier recovery loop 233 may have, for example, a second order Type-II topology.

Modifications, additions, or omissions may be made to system 210 without departing from the scope of the invention. For example, a carrier recovery loop may be employed outside of system 210, such that carrier recovery loop 233 may be omitted. Carrier recovery loop 233 is not required to achieve phase alignment of signal images $x_i$(t), estimation of signal magnitude estimates $M_i$, determination of weights $W_i$, or normalization. Additionally, functions may be performed using any suitable logic comprising software, hardware, other logic, or any suitable combination of the preceding.

Figure 4:
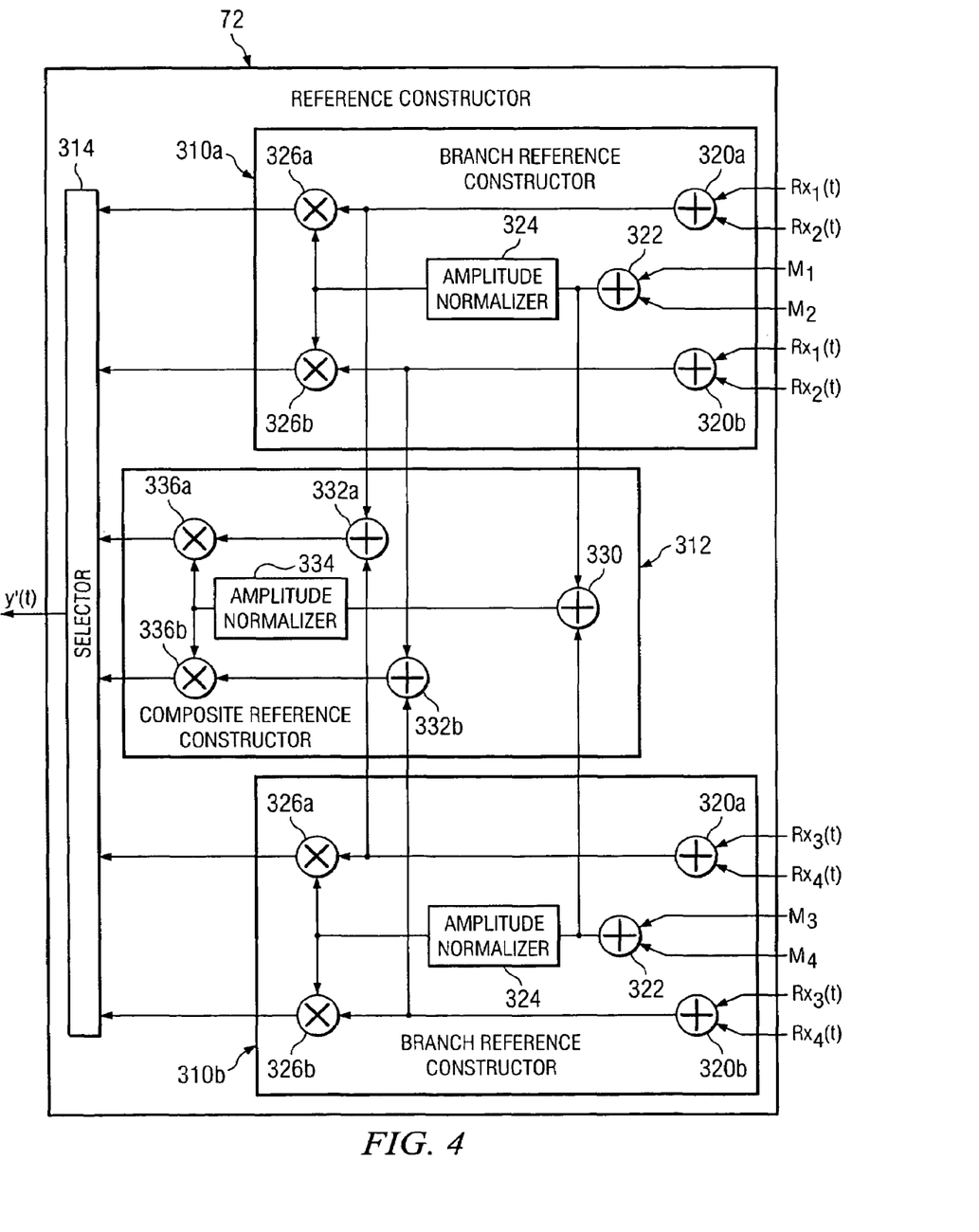
FIG. 4 is a block diagram of one embodiment of a reference constructor of the system of FIG. 1.

FIG. 4 is a block diagram illustrating one embodiment of reference constructor 72 of system 10 of FIG. 1. Reference constructor 72 combines adjusted signal images $Rx_i(t)$ in accordance with magnitude estimates $M_i$ to generate a correlation reference $y'(t)$.

Figure 5:
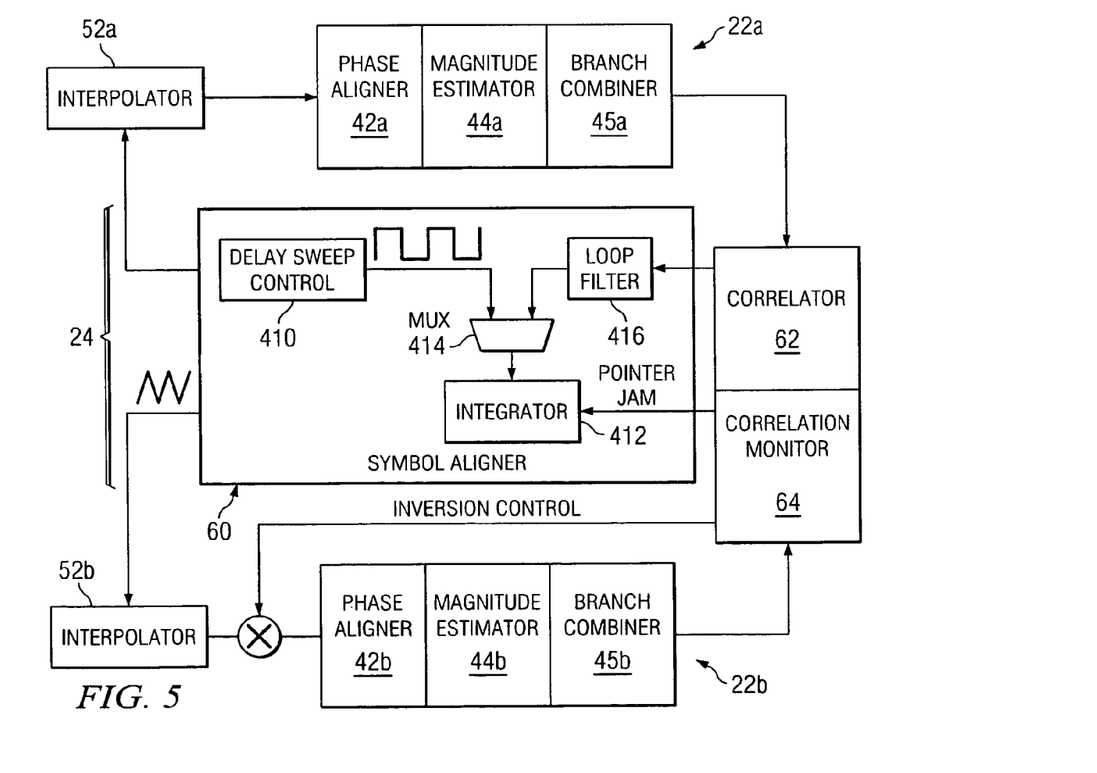
FIG. 5 is a block diagram of one embodiment of coordinating modules of the system of FIG. 1.

Reference constructor 72 includes branch reference constructors 310a–b, a composite reference constructor 312, and a selector 314 coupled as shown in FIG. 5. Branch reference constructor 310a generates a correlation reference from the signals received at frequency branch 22a, and branch reference constructor 310b generates a correlation reference from frequency branch 22b.

According to one embodiment, branch reference constructor 310a includes adders 320a–b and 322, an amplitude normalizer 324, and multipliers 326a–b. Adders 320a–b add adjusted signal images $Rx_i(t)$ generated from signals at receiver channels 50a–b. Adder 322 adds magnitude estimates $M_i$ from receiver channels 50a–b. Amplitude normalizer 324 normalizes the sum of the magnitude estimates $M_i$. Multipliers 326a–b multiply the normalized sum of the magnitude estimates $M_i$ with the sum of the adjusted signal images $Rx_i(t)$ from receiver channels 50a–b, respectively, to yield correlation references for receiver channels 50a–b, respectively. Branch reference constructor 310b may be substantially similar to branch reference constructor 310a.

Composite reference constructor 312 generates a composite correlation reference from signals received at frequency branches 22a–b. Composite reference constructor 312 includes adders 330 and 322a–b, an amplitude normalizer 334, and multipliers 336a–b. Adder 330 adds the sum of the signal magnitude estimates $M_i$ from receiver channels 50a–b with the sum of the signal magnitude estimates $M_i$ from receiver channels 50c–d to yield a combined signal magnitude estimate.

Adders 322a–b add the sum of the adjusted signal images $Rx_i(t)$ from receiver channels 50a–b with the sum of adjusted signal images $Rx_i(t)$ from receiver channels 50c–d to yield combined adjusted signal images. Amplitude normalizer 334 normalizes the amplitude of the combined signal magnitude estimate. Multipliers 336a–b multiply the combined adjusted signal image with the combined signal magnitude estimate.

Selector 314 selects the result of branch reference constructor 310a, branch reference constructor 310b, or composite reference constructor 312 in order to generate correlation reference $y'(t)$. The selection may be made in accordance with the signal energies at the frequency branches 22a–b. For example, if frequency branch 22a has acquired a signal, but frequency branch 22b has not acquired a signal, the correlation reference may derived using the signals from frequency branch 22a. If frequency branches 22a–b have acquired signals, the correlation reference may derived using the signals from frequency branches 22a–b. The contribution of each frequency branch 22a–b may be determined with respect to signal-to-noise-ratios at the frequency branches 22a–b.

Modifications, additions, or omissions may be made to reference constructor 72 without departing from the scope of the invention. For example, reference constructor 72 may include more or fewer branch reference constructors 310. Additionally, functions may be performed using any suitable logic comprising software, hardware, other logic, or any suitable combination of the preceding.

FIG. 5 is a block diagram of one embodiment of coordinating modules 24 of system 10 of FIG. 1. Coordinating modules 24 monitor the correlation among signals from frequency branches 22a–b, and provide instructions to interpolators 52a–b to delay the signals in order to correlate the signals.

In general, coordinating modules 24 perform an initial correlating procedure to initially correlate the signals, and then perform a dynamic correlating procedure to perform subsequent adjustment. For purposes of illustration only, it is assumed that the samples from the signals of frequency branch 22a are used as reference samples with which the samples from the signals from the signals of frequency branch 22b are to be correlated.

Coordinating modules 24 include symbol aligner 60, correlator 62, and correlation monitor 64. Symbol aligner 60 includes a delay sweep control 410, an integrator 412, a multiplexer (MUX) 414, and a loop filter 416. In general, delay sweep control 410 sets a range of delays that is applied to the signals during the initial correlation procedure, and loop filter 416 dynamically adjusts the delay during the subsequent dynamic correlation procedure. Multiplexer 414 switches between delay sweep control 410 and loop filter 416 depending on the procedure.

According to one embodiment, delay sweep control 410 sets a range of delays during an initial correlating procedure by providing initial values for interpolators 52a. The delay range may have any suitable range such as plus or minus four symbols. The initial values may comprise values for pointer value $\tau$ and phase $\phi$. Delay sweep control 410 sends a square wave through multiplexer 414 to integrator 412. In response, integrator 414 produces a triangular ramp that results in the desired delay range. The sweep is continued until the signals are correlated.

This invention is not dependent on any specific triangular shape of the sweep function, and is not dependent on any method of generating a triangular sweep function. Other embodiments of this invention may employ, for example, a sinusoidal sweep function generated by any suitable mathematical or heuristic method that causes the delay of the interpolator delay line to vary over the desired range of time offset.

Loop filter 416 dynamically adjusts the delay during a subsequent dynamic correlation procedure. The dynamic correlation procedure is initiated if correlation monitor 64 detects signal decorrelation. Correlator 62 generates correlation information comprising a symbol alignment tracking error, which is provided to symbol aligner 60. Loop filter 416 receives the correlation information and sends instructions to interpolators 52b in response to the information. The instructions may comprise a pointer value, which may be calculated according to correlation values that indicate the degree of signal correlation. Signals may be determined to be correlated if the correlation values satisfy a particular correlation threshold. A pointer value may comprise a value corresponding to the centroid of the correlation distributions satisfying the threshold, or may comprise a value corresponding to the midpoint between an initial correlation value satisfying a threshold and a final correlation value satisfying a threshold. Other criteria may be used to determine the delay associated with the best correlation.

In operation, according to the illustrated embodiment, frequency branch 22a acquires a signal. Frequency branch 22a provides samples from the signal to correlator 62 to be used as reference samples with which samples of frequency branch 22b are to be correlated. The pointer value $\tau$ and the phase $\phi$ for interpolators 52a of frequency branch 22a are set to initial values to designate a delay range.

Frequency branch 22b acquires a signal and provides samples from the signal to correlator 62. Interpolators 52b of frequency branch 22b sweep over the delay range. Correlator 62 monitors symbol alignment to generate correlation information. If the symbols align, multiplexer 414 switches control of interpolators 52b to loop filter 416. Loop filter 416 dynamically controls interpolators 52b in response to correlation information received from correlator 62.

Modifications, additions, or omissions may be made to the system without departing from the scope of the invention. Additionally, functions may be performed using any suitable logic comprising software, hardware, other logic, or any suitable combination of the preceding.

Certain embodiments of the invention may provide one or more technical advantages. A technical advantage of one embodiment may be that signals are combined in accordance with the signal-to-noise ratios associated with the signals, such that maximal ratio combining gain may be substantially realized. Accordingly, signals that exhibit multiple types of diversity such as temporal, frequency, polar, or spatial diversity may be combined.

Although the present invention has been described in several embodiments, various changes and modifications may be suggested to one skilled in the art. It is intended that the present invention encompass such changes and modifications as fall within the scope of the appended claims.

What is claimed is:

1. A method for generating a correlation reference, comprising:
   receiving a plurality of first signals having a first frequency;
   receiving a plurality of second signals having a second frequency;
   calculating a first correlation reference from the first signals;
   calculating a second correlation reference from the second signals;
   calculating a composite correlation reference from the first signals and the second signals; and
   generating a resulting correlation reference in accordance with a correlation reference selected from the set consisting of the first correlation reference, the second correlation reference, and the composite correlation reference.

2. The method of claim 1, wherein calculating the first correlation reference from the first signals comprises:
   estimating a plurality of signal magnitude estimates according to the first signals, each signal magnitude estimate associated with a first signal; and
   calculating the first correlation reference according to the signal magnitude estimates.

3. The method of claim 1, wherein calculating the first correlation reference from the first signals comprises:
   adjusting a phase alignment of the first signals to yield a plurality of adjusted signals;
   estimating a plurality of signal magnitude estimates according to the first signals, each signal magnitude estimate associated with a first signal; and
   calculating the first correlation reference according to the adjusted signals and the signal magnitude estimates.

4. The method of claim 1, wherein calculating the first correlation reference from the first signals comprises:
   determining a signal energy associated with each first signal of the first signals;
   determining a contribution of each first signal in accordance with the determined signal energies; and
   calculating the first correlation reference in accordance with the determined contributions.

5. The method of claim 1, wherein generating the resulting correlation reference in accordance with a correlation reference selected from the set consisting of the first correlation reference, the second correlation reference, and the composite correlation reference comprises:
   determining a first signal energy associated with the first correlation reference;
   determining a second signal energy associated with the second correlation reference; and
   selecting the resulting correlation reference from the first correlation reference, the second correlation reference, and the composite correlation reference in accordance with the first signal energy and the second signal energy.

6. A system for generating a correlation reference, comprising:
   a first branch reference constructor operable to calculate a first correlation reference from a plurality of first signals having a first frequency;
   a second branch reference constructor operable to calculate a second correlation reference from a plurality of second signals having a second frequency; and
   a composite reference constructor operable to calculate a composite correlation reference from the first signals and the second signals; and
   a selector coupled to the first branch reference constructor, the second branch reference constructor, and the composite reference constructor and operable to generate a resulting correlation reference in accordance with a correlation reference selected from the set consisting of the first correlation reference, the second correlation reference, and the composite correlation reference.

7. The system of claim 6, wherein the first branch reference constructor is operable to calculate the first correlation reference from the first signals by:
   estimating a plurality of signal magnitude estimates according to the first signals, each signal magnitude estimate associated with a first signal; and
   calculating the first correlation reference according to the signal magnitude estimates.

8. The system of claim 6, wherein the first branch reference constructor is operable to calculate the first correlation reference from the first signals by:
   adjusting a phase alignment of the first signals to yield a plurality of adjusted signals;
   estimating a plurality of signal magnitude estimates according to the first signals, each signal magnitude estimate associated with a first signal; and
   calculating the first correlation reference according to the adjusted signals and the signal magnitude estimates.

9. The system of claim 6, wherein the first branch reference constructor is operable to calculate the first correlation reference from the first signals by:
   determining a signal energy associated with each first signal of the first signals;
   determining a contribution of each first signal in accordance with the determined signal energies; and
   calculating the first correlation reference in accordance with the determined contributions.

10. The system of claim 6, wherein the selector is operable to generate a resulting correlation reference in accordance with a correlation reference selected from the set consisting of the first correlation reference, the second correlation reference, and the composite correlation reference by:
    determining a first signal energy associated with the first correlation reference;

determining a second signal energy associated with the second correlation reference; and selecting the resulting correlation reference from the first correlation reference, the second correlation reference, and the composite correlation reference in accordance with the first signal energy and the second signal energy.

11. Logic for generating a correlation reference, the logic embodied in a computer readable medium and operable to:

receive a plurality of first signals having a first frequency;

receive a plurality of second signals having a second frequency;

calculate a first correlation reference from the first signals;

calculate a second correlation reference from the second signals;

calculate a composite correlation reference from the first signals and the second signals; and generate a resulting correlation reference in accordance with a correlation reference selected from the set consisting of the first correlation reference, the second correlation reference, and the composite correlation reference.

12. The logic of claim 11, operable to calculate the first correlation reference from the first signals by:

estimating a plurality of signal magnitude estimates according to the first signals, each signal magnitude estimate associated with a first signal; and calculating the first correlation reference according to the signal magnitude estimates.

13. The logic of claim 11, operable to calculate the first correlation reference from the first signals by:

adjusting a phase alignment of the first signals to yield a plurality of adjusted signals;

estimating a plurality of signal magnitude estimates according to the first signals, each signal magnitude estimate associated with a first signal; and calculating the first correlation reference according to the adjusted signals and the signal magnitude estimates.

14. The logic of claim 11, operable to calculate the first correlation reference from the first signals by:

determining a signal energy associated with each first signal of the first signals;

determining a contribution of each first signal in accordance with the determined signal energies; and calculating the first correlation reference in accordance with the determined contributions.

15. The logic of claim 11, operable to generate the resulting correlation reference in accordance with a correlation reference selected from the set consisting of the first correlation reference, the second correlation reference, and the composite correlation reference by:

determining a first signal energy associated with the first correlation reference;

determining a second signal energy associated with the second correlation reference; and selecting the resulting correlation reference from the first correlation reference, the second correlation reference, and the composite correlation reference in accordance with the first signal energy and the second signal energy.

16. A system for generating a correlation reference, comprising:

means for receiving a plurality of first signals having a first frequency;

means for receiving a plurality of second signals having a second frequency;

means for calculating a first correlation reference from the first signals;

means for calculating a second correlation reference from the second signals;

means for calculating a composite correlation reference from the first signals and the second signals; and means for generating a resulting correlation reference in accordance with a correlation reference selected from the set consisting of the first correlation reference, the second correlation reference, and the composite correlation reference.

17. A method for generating a correlation reference, comprising:

receiving a plurality of first signals having a first frequency, and receiving a plurality of second signals having a second frequency;

calculating a first correlation reference from the first signals by:

adjusting a phase alignment of the first signals to yield a plurality of adjusted signals, estimating a plurality of signal magnitude estimates according to the first signals, each signal magnitude estimate associated with a first signal, and calculating the first correlation reference according to the adjusted signals and the signal magnitude estimates;

estimating a plurality of signal magnitude estimates according to the first signals, each signal magnitude estimate associated with a first signal, and calculating the first correlation reference according to the signal magnitude estimates; and determining a signal energy associated with each first signal of the first signals, determining a contribution of each first signal in accordance with the determined signal energies, and calculating the first correlation reference in accordance with the determined contributions;

calculating a second correlation reference from the second signals;

calculating a composite correlation reference from the first signals and the second signals; and generating a resulting correlation reference in accordance with a correlation reference selected from the set consisting of the first correlation reference, the second correlation reference, and the composite correlation reference by determining a first signal energy associated with the first correlation reference, by determining a second signal energy associated with the second correlation reference, and by selecting the resulting correlation reference from the first correlation reference, the second correlation reference, and the composite correlation reference in accordance with the first signal energy and the second signal energy.

* * * * *